US011657070B2

(12) United States Patent
Sannapareddy et al.

(10) Patent No.: US 11,657,070 B2
(45) Date of Patent: *May 23, 2023

(54) MANAGEMENT OF DATA WAREHOUSE FOR ELECTRONIC PAYMENT TRANSACTION PROCESSING NETWORKS

(71) Applicant: Visa International Service Association, San Francisco, CA (US)

(72) Inventors: Rohith Reddy Sannapareddy, Sunnyvale, CA (US); Nikhil Jayant Ghate, Sunnyvale, CA (US); Sukalyan Chakraborty, Fremont, CA (US); Abhijith Ramesh Kashyap, San Carlos, CA (US); Prithwiraj Mitra, Foster City, CA (US); Mahesh Govind Joshi, Belmont, CA (US); Basudeb Ghosh, Fremont, CA (US); Nelson Inas Dsouza, Mountain View, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/670,302

(22) Filed: Feb. 11, 2022

(65) Prior Publication Data
US 2022/0164368 A1 May 26, 2022

Related U.S. Application Data

(63) Continuation of application No. 16/680,045, filed on Nov. 11, 2019, now Pat. No. 11,281,697.

(51) Int. Cl.
*G06F 16/00* (2019.01)
*G06F 16/28* (2019.01)
(Continued)

(52) U.S. Cl.
CPC ........ *G06F 16/283* (2019.01); *G06F 16/2272* (2019.01); *G06F 16/23* (2019.01); *G06Q 20/102* (2013.01)

(58) Field of Classification Search
CPC ..... G06F 16/283; G06F 16/2272; G06F 16/23
(Continued)

(56) References Cited

U.S. PATENT DOCUMENTS 8,706,557 B1 * 4/2014 Tavares ................ G06Q 20/204
705/16
9,836,743 B2 12/2017 Celikyilmaz
(Continued)

*Primary Examiner* — Chelcie L Daye
(74) *Attorney, Agent, or Firm* — Schwabe, Williamson & Wyatt, PC

(57) ABSTRACT

Embodiments include apparatuses, methods, and systems for managing a data warehouse associated with an electronic payment transaction processing network. A first set of stores are active and a second set of stores are inactive in an offer program related to merchandise of a merchant. A first set of transaction records for a first set of transactions from the first set of stores and a second set of transaction records for a second set of transactions from the second set of stores are obtained. A first set of operations on the data warehouse for the first set of transaction records and a second set of operations on the data warehouse for the second set of transaction records may be performed. The second set of operations, different from the first set of operations, includes an update operation on the data warehouse. Other embodiments may also be described and claimed.

17 Claims, 5 Drawing Sheets

(51) Int. Cl.
     *G06Q 20/10*     (2012.01)
     *G06F 16/23*     (2019.01)
     *G06F 16/22*     (2019.01)

(58) Field of Classification Search
     USPC .......................................................... 707/600
     See application file for complete search history.

(56) References Cited

U.S. PATENT DOCUMENTS

| | | | |
|---|---|---|---|
| 10,269,077 B2 | 4/2019 | Celikyilmaz | |
| 2015/0356556 A1* | 12/2015 | Celikyilmaz | ........ G06Q 20/202 |
| | | | 705/14.51 |
| 2015/0356690 A1* | 12/2015 | Celikyilmaz | .......... G06Q 40/12 |
| | | | 705/30 |

* cited by examiner

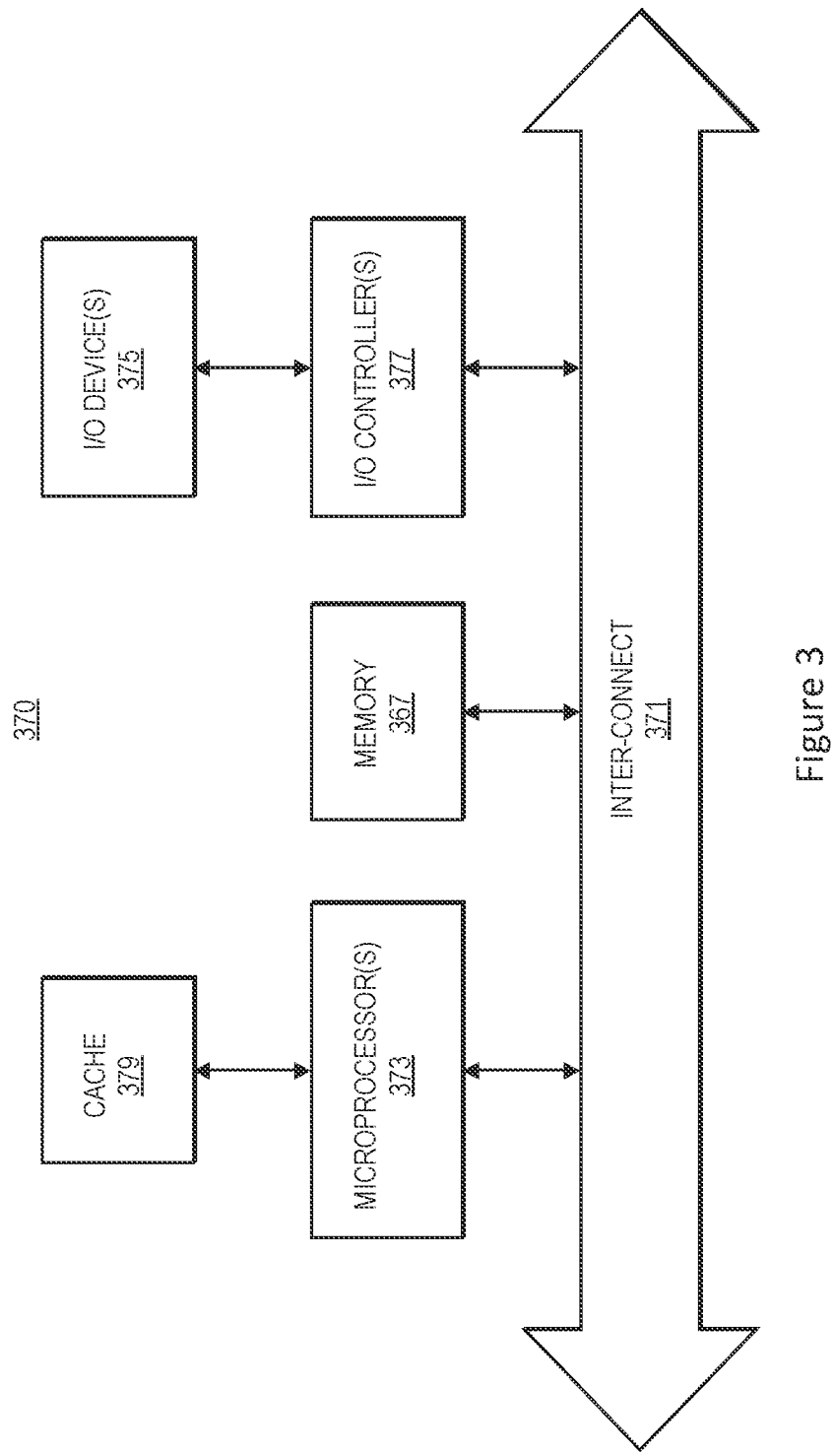

MANAGEMENT OF DATA WAREHOUSE FOR ELECTRONIC PAYMENT TRANSACTION PROCESSING NETWORKS

CROSS-REFERENCE TO RELATED APPLICATIONS

This application is a continuation of U.S. application Ser. No. 16/680,045, filed on Nov. 11, 2019, the entire disclosure of which is incorporated herein by reference and for all purposes.

BACKGROUND

An electronic payment transaction processing network may facilitate transactions among consumers, merchants, processors, banks, independent sales organizations (ISOs), or other payment processing parties. Every year, billions of electronic payment transactions and trillions of dollars are processed through the electronic payment transaction processing networks. A large amount of data are generated by those transactions through the electronic payment transaction processing networks. A data warehouse is a central repository of information that can be analyzed to make better informed decisions. Data flows regularly into a data warehouse from transactional systems, relational databases, and other sources. Data warehouses used in the electronic payment transaction processing networks play an important role for processing payment transactions. Hence, it is important that a data warehouse can operate efficiently to handle the large number of payment transactions.

BRIEF DESCRIPTION OF SEVERAL VIEWS OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 illustrates an example device suitable for use to practice various aspects of the present disclosure, in accordance with various embodiments.

DETAILED DESCRIPTION

Figure 1A:
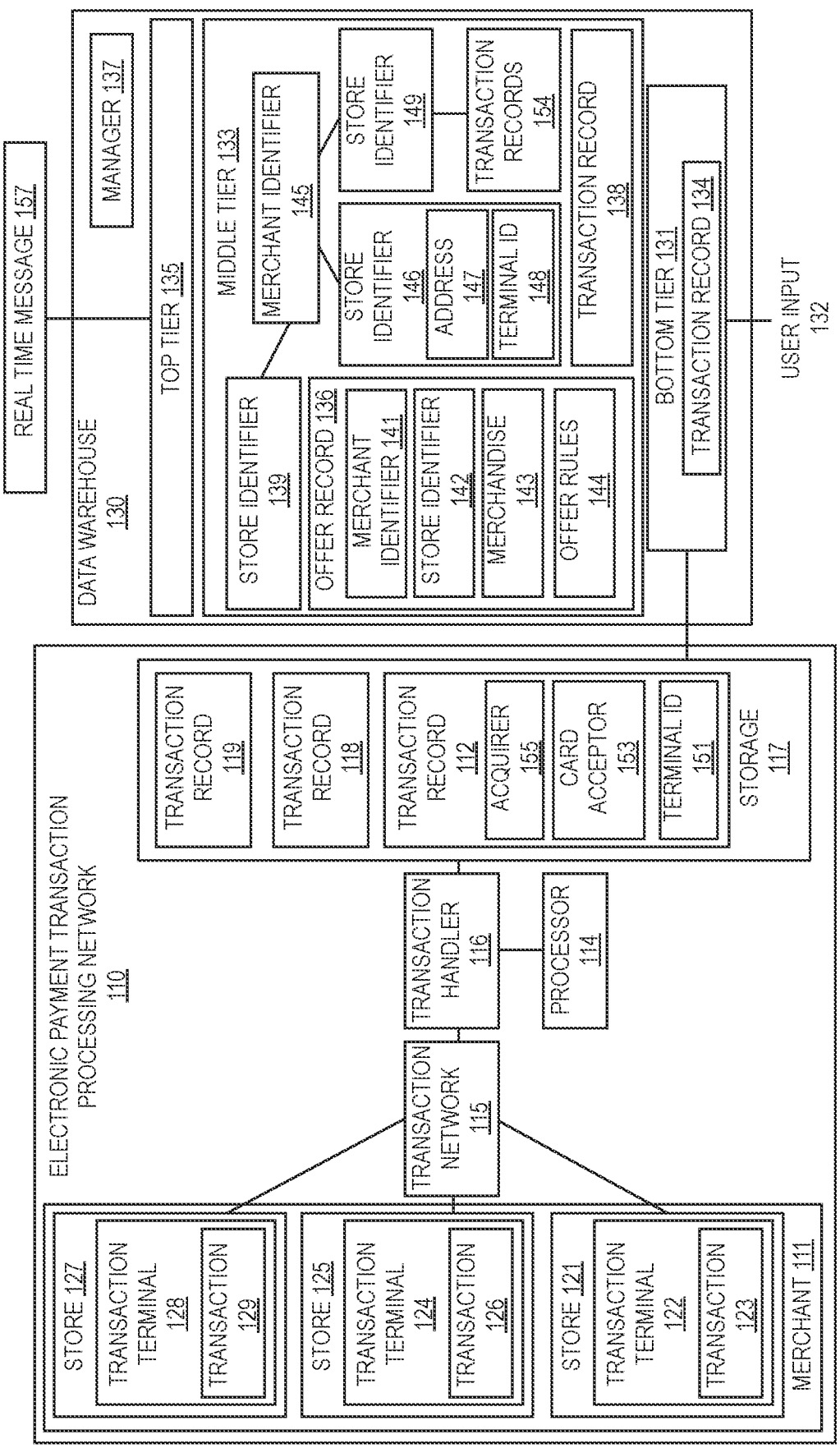
FIGS. 1(a)-1(b) illustrate an example system and process to manage a data warehouse associated with an electronic payment transaction processing network, in accordance with various embodiments.

The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the current disclosure. Various embodiments will also be described in the context of particular methods having certain steps. However, the method and system operate effectively for other methods having different and/or additional steps and steps in different orders that are not inconsistent with the presented embodiments. Thus, the current disclosure is not intended to be limited to the embodiments shown, but is to be accorded the widest scope consistent with the principles and features described herein.

The disclosed embodiments relate to management of a data warehouse for an electronic payment transaction processing network, which may include a specialized database different from a general database, e.g., a database for transactional work. A data warehouse (DW or DWH), also known as an enterprise data warehouse (EDW), an operational data store (ODS), or a data mart, is a special kind of database that is designed for analytical rather than transactional work. A data warehouse serves as a federated repository for all or certain data sets collected by a business's operational systems. A data warehouse collects and aggregates data from one or many sources so it can be analyzed to produce business insights, while a generic database may be more focused on transactional work. A data warehouses used in an electronic payment transaction processing network is a further specialized data warehouse that collects and aggregates data about multiple parties, e.g., consumers, merchants, processors, banks, independent sales organizations (ISOs), to facilitate payment transactions. A data warehouse may be housed on an enterprise server, a server within a cloud, or hybrid cloud data warehouse. Embodiments herein are related to specific improvements to the way computers, e.g., enterprise servers or cloud, operate a data warehouse for an electronic payment transaction processing network.

A data warehouse used in an electronic payment transaction processing network may include transaction records for a merchant, where the merchant may have multiple stores, and each store may have multiple transactional terminals that process some payment transactions. A payment transaction record may be generated for a payment transaction processed by a transactional terminal within a store of a merchant. The multiple stores of a merchant may be operated in different ways. For example, some stores of a merchant in one location may have some active offer program that provides some discount to some merchandises of the merchant, while some other stores of the merchant in another location may be inactive in the offer program. Currently, a data warehouse used in an electronic payment transaction processing network lacks the ability to handle the payment transaction records generated by different transactional terminals in different stores of the same merchant in different ways. When a merchant has an active offer program in which some stores of the merchant are participating and some other stores are not participating, the data warehouse may treat all the payment transaction records of the merchant in a same way. For example, the data warehouse may freeze or stop certain operations to be performed on the data warehouse for all payment transaction records associated with the merchant, even though the payment transaction records may be from stores of the merchant that are inactive in the offer program.

Embodiments herein provide the improved functionality for the data warehouse to perform different operations depending on which stores the payment transaction records are originated. Embodiments herein may improve the operational efficiency for the data warehouse, which may bring business benefits as byproducts. The merchant, the multiple stores of the merchant, and the multiple transactional terminals in each store of the merchant form a hierarchical relationship of the entities in the data warehouse. Techniques provided in embodiments take advantage of the hierarchical relationship of the entities in the data warehouse, so that the data warehouse may treat the payment transaction records of the merchant from different stores in different ways, depending on whether the stores are active in the offer program or not. Techniques provided herein may be applicable to a data warehouse having multiple entities with a hierarchical relationship, like a merchant including multiple stores, which are based on limited rules with specific characteristics. Techniques provided herein may not be applicable to generic database or to a data warehouse that does not have multiple entities with a hierarchical relationship.

Embodiments disclosed herein include a computer-implemented method for managing a data warehouse of an electronic payment transaction processing network. The method includes determining, based on one or more offer records stored in the data warehouse, a first set of stores that are active in an offer program related to merchandise of a merchant, and a second set of stores that are inactive in the offer program. Both the first set of stores and the second set of stores are associated with the merchant. The offer program related to the merchandise of the merchant is different from a normal program related to the merchandise of the merchant. The method further includes obtaining, by a transaction handler operating on a processor, a first set of transaction records for a first set of transactions from the first set of stores through the electronic payment transaction processing network, and a second set of transaction records for a second set of transactions from the second set of stores through the electronic payment transaction processing network. Afterwards, the method includes storing, in a storage device coupled to the processor, the first set of transaction records and the second set of transaction records. In addition, the method includes performing, by a data warehouse manager, a first set of operations on the data warehouse for the first set of transaction records, and a second set of operations on the data warehouse for the second set of transaction records. The second set of operations includes an update operation on the data warehouse for the second set of transaction records, and the second set of operations is different from the first set of operations.

Embodiments disclosed herein include an executable software product stored on a non-transitory computer-readable medium containing program instructions for managing a data warehouse for an electronic payment transaction processing network. The program instructions are for obtaining a first set of transaction records for a first set of transactions from a first set of stores through the electronic payment transaction processing network, and a second set of transaction records for a second set of transactions from a second set of stores through the electronic payment transaction processing network. The first set of stores and the second set of stores are associated with the merchant. The first set of stores are active in an offer program related to merchandise of a merchant, and the second set of stores are inactive in the offer program. The offer program related to the merchandise of the merchant is different from a normal program related to the merchandise of the merchant. The program instructions are also for performing a first set of operations on the data warehouse for the first set of transaction records, and a second set of operations on the data warehouse for the second set of transaction records, where the second set of operations include an update operation on the data warehouse for the second set of transaction records, and the second set of operations is different from the first set of operations.

Embodiments disclosed herein include a system for managing a data warehouse for an electronic payment transaction processing network. The system includes a storage to store a plurality of transaction records of the data warehouse. The system also includes a transaction handler to be operated on one or more processors, where the transaction handler is configured to obtain a first set of transaction records for a first set of transactions from a first set of stores through the electronic payment transaction processing network, and a second set of transaction records for a second set of transactions from a second set of stores through the electronic payment transaction processing network. The first set of stores and the second set of stores are associated with a same merchant. The first set of stores are active in an offer program related to merchandise of a merchant, and the second set of stores are inactive in the offer program. The offer program related to the merchandise of the merchant is different from a normal program related to the merchandise of the merchant. The system further includes data warehouse manager to be operated on the one or more processors, where the data warehouse manager is configured to perform an update operation on the data warehouse for the second set of transaction records, while not to perform the update operation on the data warehouse for the first set of transaction records.

Figure 1B:
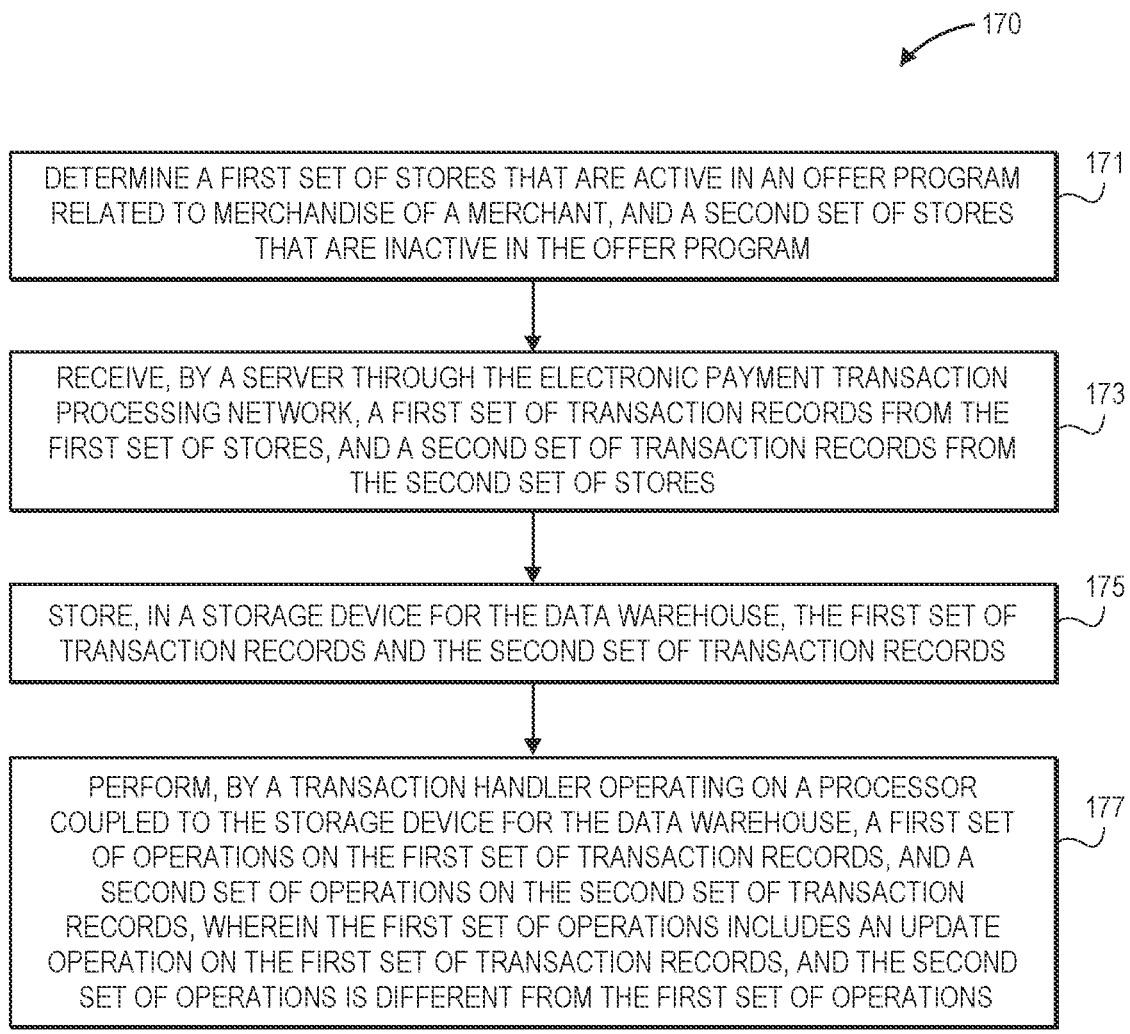

FIGS. 1(a)-1(b) illustrate an example system and process to manage a data warehouse 130 associated with an electronic payment transaction processing network 110, in accordance with various embodiments.

In embodiments, the electronic payment transaction processing network 110 includes one or more merchants, e.g., a merchant 111, a transaction network 115, a transaction handler 116 to be operated on a processor 114, and a storage 117 that may be coupled to the processor 114. The merchant 111 may include multiple stores, e.g., a store 121 located in a first region, a store 125 located in a second region different from the first region, and a store 127. For example, the first region may be within a first city or country, and the second region may be within a second city or country. A store may include multiple transactional terminals that process some payment transactions. For example, the store 121 includes a transactional terminal 122, which may process a payment transaction 123. The store 125 includes a transactional terminal 124, which may process a payment transaction 126. The store 127 includes a transactional terminal 128, which may process a payment transaction 129. A payment transaction, e.g., the payment transaction 123, the payment transaction 126, or the payment transaction 129 may be a debit card transaction, a prepaid credit transaction, a credit transaction, a fund transfer transaction, a mobile payment transaction, an online transaction, or a commercial payment transaction.

In embodiments, a transaction processed by a transactional terminal in a store may go through the transaction network 115 to request an authorization or approval by the transaction handler 116. The transaction network 115 may include any telecommunication network, wired or wireless network connecting a transactional terminal to the transaction handler 116 of a payment processing facility. When the transaction handler 116 approves a transaction, the transaction handler 116 also generates a transaction record to be stored in the storage 117. For example, the transactional terminal 122 may process the payment transaction 123, which may be approved by the transaction handler 116 through the transaction network 115, while the transaction handler 116 generates a transaction record 112 stored in the storage 117. Similarly, the transactional terminal 124 may process the payment transaction 126, which may be approved by the transaction handler 116 through the transaction network 115, while the transaction handler 116 generates a transaction record 118 stored in the storage 117. The transactional terminal 128 may process the payment transaction 129, which may be approved by the transaction handler 116 through the transaction network 115, while the transaction handler 116 generates a transaction record 119 stored in the storage 117. The transaction record 112, the transaction record 118, or the transaction record 119 may be a transaction record for a debit card transaction, a prepaid credit transaction, a credit transaction, a fund transfer transaction, a mobile payment transaction, an online transaction, or a commercial payment transaction. A transaction record may include a terminal identifier, or a card acceptor identifier. For example, the transaction record 112 may include a terminal identifier 151, a card acceptor identifier 153, and an acquirer identifier 155. Furthermore, a transaction record may include other information, e.g., the date and time of the transaction, the amount of the transaction, merchant address and/or merchant name, account information identifying the consumer account from which the payment is made, and more.

In embodiments, the data warehouse 130 may refer to a set of components that work together to provide the overall data-warehousing capability to an organization. The data warehouse 130 is different from a generic database. A database is the generic term for a storage system to store data, which is used for many purposes, including, for example, transaction processing, supporting application functionality and enabling reporting. Databases include, for example, online transactional processing (OLTP) used in application databases, online analytical processing (OLAP) used in data warehouses, XML, comma-separated values (CSV) files, text files and spreadsheets. Most databases are constrained in use to a specific application, business process or purpose. A database designed to handle transactions isn't structured to do analytics well. In comparison, a data warehouse is a specialized set of capabilities for extracting data from transactional systems and storing them in a specific type of database that it organized and optimized to support data analysis and reporting.

In embodiments, the data warehouse 130 may include multiple databases that store data at different levels of transformation, including source databases, operational data stores, the core data warehouse database and specialized data marts that present filtered views of the data to users. The data warehouse 130 may be implemented as a special relational database as a layer on top of other databases. In detail, the data warehouse 130 may typically include one or more databases, tools for performing extract, transform and load (ETL) from source systems, capabilities for managing data schemas and the data dictionary, with tools for publishing data to data marts and consuming systems. The data warehouse 130 is focused on collecting data from multiple sources to facilitate broad access and analysis, and further optimized to store large volumes of historical data and enables fast and complex querying of that data. The data warehouse 130 specializes in data aggregation and provides a longer view of an organization's data over time. In addition, the data warehouse 130 may serve as a query execution and processing engine for that data, enabling end users to interact with the data that is stored in the database over which the data warehouse 130 is built on. Complex queries are very difficult to run without a temporary pause of database update operations. A frequently paused transactional database will inevitably lead to data errors and gaps. Therefore a data warehouse serves as a separate platform for aggregation across multiple sources and then for analytics tasks across those diverse sources. This separation of roles allows databases to remain focused on transactional jobs without interruption.

The data warehouse 130 may include multiple tiers, e.g., a bottom tier 131, a middle tier 133, a top tier 135, and a data warehouse manager 137. In some embodiments, the data warehouse manager 137 may be implemented as a part of the other tiers, e.g., the bottom tier 131, the middle tier 133, or the top tier 135. The data warehouse 130 may be an offline operational data warehouse, offline data warehouse, on time data warehouse, or an integrated data warehouse. The bottom tier 131 may be a database server used to extract data from multiple sources, e.g., to extract a transaction record 134 from the storage 117. The middle tier 133 may be an online analytical processing (OLAP) server, which transforms data to enable analysis and complex queries. For example, the middle tier 133 may include a transaction record 138, which may be a transformed one from the transaction record 134. For example, the transaction record 138 may have same or similar content with the transaction record 134 but in different format conforming to the format for the middle tier 133. The top tier 135 may be tools used for high-level data analysis, querying, reporting, and data mining, and further provide services to other applications, e.g., a real time message application 157. The data warehouse 130 may accept inputs from various sources, e.g., from the storage 117 of the electronic payment transaction processing network 110, or by user input 132. The illustration of the data warehouse 130 and the electronic payment transaction processing network 110 are for example only, and are not limiting. In some other embodiments, the data warehouse 130 may be viewed as a part of the electronic payment transaction processing network 110.

In embodiments, there may be one or more offer records, e.g., an offer record 136, stored in the data warehouse 130, e.g., within the middle tier 133. The offer record 136 may include a merchant identifier 141 to identify the merchant, a store identifier 142 to identify a store associated with the merchant, a merchandise identifier 143 at the store of the merchant, and some offer rules 144. The offer program related to the merchandise of the merchant is different from a normal program related to the merchandise of the merchant. For example, the offer rules 144 may define an offer program as a discount for certain merchandise in some of the stores of the merchant. An offer program may be any of the program different from the normal or default program for a merchandise. The offer record 136 may be stored in other tiers as well. The multiple entities, e.g., a merchant, a store, and a terminal may form a hierarchical relationship within the data warehouse 130. The merchant may be referred to as a parent node for the stores in the hierarchical relationship, and the parent node includes multiple child nodes, e.g., the stores. For example, a merchant identifier 145 may include a store with a store identifier 146, a store with a store identifier 149, and a store with a store identifier 139. The merchant identifier 145, the store identifier 146, the store identifier 149, and the store identifier 139 represent the merchant 111, the store 121, the store 125, and the store 127. A store identifier, e.g., the store identifier 146 may include an address 147 for the store, and a terminal identifier 148 for a transactional terminal within the store. Transaction records stored in the data warehouse 130 may be associated with a specific store of the merchant. For example, one or more transaction records 154 are associated with the store identifier 149. A merchant may have a first set of stores and a second set of stores associated with the merchant, where the first set of stores are active in an offer program related to merchandise of the merchant, and the second set of stores are inactive in the offer program. For example, the store 121 may be active in the offer program defined by the offer record 136, and the store 125 may be inactive in the offer program defined by the offer record 136.

FIG. 1(*b*) illustrates an example process 170 to manage a data warehouse 130 associated with an electronic payment transaction processing network 110. The process 170 may be performed by the data warehouse manager 137 and the transaction handler 116.

In embodiments, at an interaction 171, the data warehouse manager 137 determines, based on one or more offer records stored in the data warehouse, a first set of stores that are active in an offer program related to merchandise of a merchant, and a second set of stores that are inactive in the offer program. For example, the data warehouse manager 137 may determine, based on the offer record 136, that the store 121 is active in the offer program, and the store 125 is inactive in the offer program.

In embodiments, at an interaction 173, the transaction handler 116 obtains a first set of transaction records for a first set of transactions from the first set of stores through the electronic payment transaction processing network 110, and a second set of transaction records for a second set of transactions from the second set of stores through the electronic payment transaction processing network 110. For example, the transaction handler 116 obtains the transaction record 112 for the transaction 123 from the store 121, and obtain the transaction record 118 for the transaction 126 from the store 125.

In embodiments, at an interaction 177, the transaction handler 116 stores, in the storage device 117 coupled to the processor 114, the first set of transaction records and the second set of transaction records. For example, the transaction handler 116 stores transaction record 112 and the transaction record 118 in the storage device 117.

In embodiments, at an interaction 177, the data warehouse manager 137 performs a first set of operations on the data warehouse for the first set of transaction records, and a second set of operations on the data warehouse for the second set of transaction records. The second set of operations include an update operation on the data warehouse for the second set of transaction records, and the second set of operations is different from the first set of operations. For example, the data warehouse manager 137 performs an update operation for the store 125 based on the transaction record 118, which becomes the transaction record 138 stored in the data warehouse 130. The data warehouse manager 137 may update the transaction records for the store 125 since the store 125 is inactive in the offer program. On the other hand, data warehouse manager 137 does not perform an update operation for the store 121 based on the transaction record 112, since the store 121 is active in the offer program. In general, the second set of operations to be performed on the data warehouse 130 for a store that is inactive in the offer program may further include add transaction records to the data warehouse, remove transaction records from the data warehouse. On the other hand, the first set of operations to be performed for a store that is active in the offer program may further include read or write operation on the data warehouse, and does not include an update operation on the data warehouse.

In embodiments, the update operation performed by the data warehouse manager 137 for transaction records associated with the store 125 may change the transaction records associated with the store 125, which is identified by the store identifier 149. For example, the data warehouse 130 includes a first group of transaction records 154 for the store 125 identified by the store identifier 149 before performing the update operation, and has a second group of transaction records for the store 125 identified by the store identifier 149 after performing the update operation, where the second group of transaction records include both the first group of transaction records 154 and the transaction record 138. After performing the update operation, the data warehouse manager 137 may publish, the second group of transaction records including both the first group of transaction records 154 and the transaction record 138 to be available for usage by other applications. For example, other applications may include a real time message application 157 communicating with the top tier 135.

As shown above, the operations and interactions involved in the process 170 are not simply storing, organizing, and retrieving operations in a database or a data warehouse, neither are they merely concept of organizing information using data warehouse. Instead, the operations and interactions involved in the process 170 improve operations of a specific data warehouse 130 associated with the electronic payment transaction processing network. More specifically, the data warehouse 130 includes a hierarchical relationship formed by entities of the data warehouse 130.

In some embodiments, the data warehouse manager 137 may also receive an input including a third set of stores from an input source, the user input 132. The transaction handler 116 may obtain a third set of transaction records for a third set of transactions through the electronic payment transaction processing network from the third set of stores. The data warehouse manager 137 further performs the second set of operations on the data warehouse for the third set of transaction records, e.g., performing the update operation on the data warehouse 130 for the third set of transaction records. The third set of stores includes a store that is active in the offer program. In other words, a user may manually override the non-update protection for a store active in an offer program, and the data warehouse manager 137 performs update operation on the data warehouse 130 for transaction records associated with an active store.

Figure 2A:
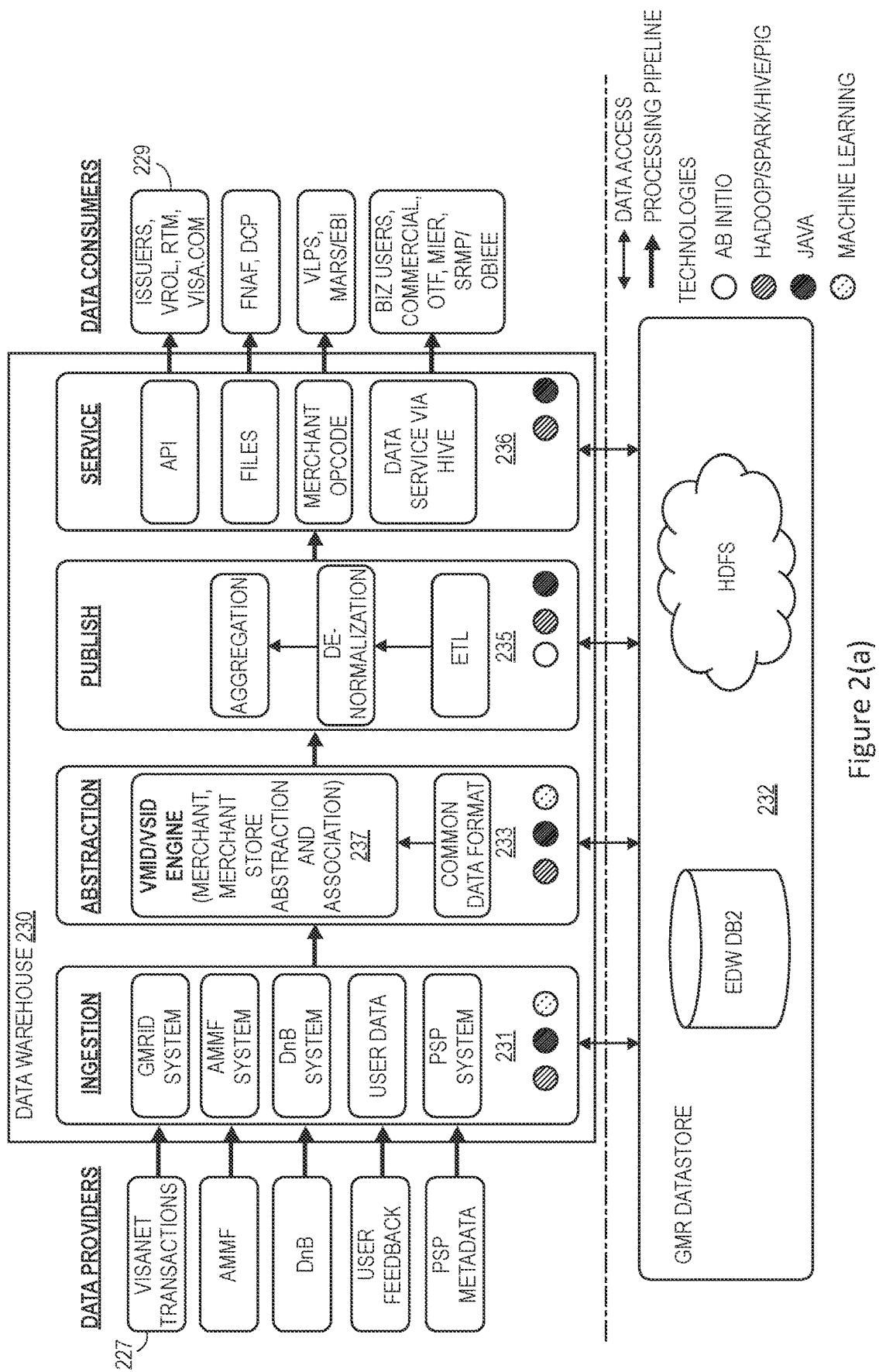
FIGS. 2(a)-2(b) illustrate another example system and process for managing a data warehouse associated with an electronic payment transaction processing network, in accordance with various embodiments.

FIGS. 2(*a*)-2(*b*) illustrate another example system and process for managing a data warehouse associated with an electronic payment transaction processing network, in accordance with various embodiments. FIG. 2(*a*) illustrates an example data warehouse 230 as an example of the data warehouse 130 shown in FIG. 1(*a*). The data warehouse 230 may be an abstract view of the global merchant repository (GMR) data warehouse, which is used in connection with an electronic payment transaction processing network, Visanet®. VisaNet is an electronic payment processing system that is used to operate with e-commerce transactions. On average a transaction using VisaNet takes less than a second. GMR is an effort by Visa® to create a master file of merchant information from data provided by the merchant's acquiring bank and from external data providers. In GMR, every merchant is identified by a Visa Merchant identifier (VMID), who has multiple store locations identified by Visa store identifiers (VSID). At each location there are multiple transacting entities or transactional terminals called GMRIDs.

In embodiments, the data warehouse 230 includes an ingestion layer 231, an abstraction layer 233, a publish layer 235, and a service layer 236. The ingestion layer 231 is similar to the bottom tier 131, the abstraction layer 233 is similar to the middle tier 133, and both the publish layer 235 and the service layer 236 together are similar to the top tier 135, as shown in FIG. 1(a). A VMID/VSID engine 237 within the abstraction layer 233 is similar to the data warehouse manager 137 as shown in FIG. 1(a). The ingestion layer 231 receives data, e.g., transaction records, from many sources, e.g., Visanet transactions 227, acquirer merchant master file (AMMF), Payment Solution Provider (PSP) metadata, user feedback, or DnB. All payment transactions are linked to a GMR entity via a unique transaction identifier. The abstraction layer 233 or the VMID/VSID engine 237 may convert the data in the ingestion layer 231 layer into a common data format. For example, the common data format may include VMID and VSID for the transaction records. Each GMR-stamped transaction record, e.g., being processed by the ingestion layer 231 and the abstraction layer 233, is mapped to a merchant ID and a store ID, where the merchant and its associated multiple stores may form a hierarchical relationship, as shown in FIG. 1(a). Various transaction records may be stored in a data store 232. After being processed in the abstraction layer 233, data or transaction records may be processed by the publish layer 235 and the service layer 236. For example, the publish layer 235 may perform ETL, de-normalization, or aggregation on the transaction records, and the service layer 236 may provide API to data consumers, e.g., real time message (RTM) 229.

In embodiments, the RTM 229 may use the hierarchical relationship between a merchant and the multiple stores associated with the merchant to run loyalty offers, which may bring more efficiency to the RTM 229 compared to use each store individually for the RTM. Since these offers are live offers, to ensure the offer to be consistent without missing a valid transaction, a mechanism may be used to prevent any changes in the hierarchical relationship between the merchant and the multiple stores associated with the merchant. As a result, in the current technology, the RTM 229 request a VMID level freeze at the data warehouse 230, even when the offer is only active within specific regions, countries, or cities for the merchant, or active for a time period for a store. Hence, the data warehouse 230 stops consuming updates to entities, e.g., stores associated with the VMID.

For example, there is an offer program shown in the following table, for the Dominos pizza store level offer at a store with VSID (73423512). The offer starts (on-boarded date) on Nov. 20, 2018, and ends (off-boarded date) Feb. 24, 2019.

TABLE 1

| Merchant Group Name | VMID | VSID | On-Boarded Date | Off-Boarded Date |
| --- | --- | --- | --- | --- |
| THANKSAGAIN2CL | 58000256 | 73423512 | Nov. 20, 2018 | Feb. 24, 2019 |

Below is the snap shot of transaction records stored in the data warehouse 230 for dominos during the on-boarding time when the offer is active in the store with VSID (73423512).

TABLE 2

| SOURCE_REC_ID | SOURCE_NM | Merchant Name | Street | Address | City | ST | Zip | Tax |
| --- | --- | --- | --- | --- | --- | --- | --- | --- |
| 23366424003 | GMR | Dominos | null | | Seattle | WA | 98144 | |
| 23562424004 | GMR | Dominos | null | 65662 | Seattle | WA | 98144 | |
| 492389621 | AMMF | Dominos | 2928 | 1st Ave | Seattle | WA | 98144 | |

During the offer active time, the transaction records for stores of dominos are frozen and stopped consuming updates to entities belonging to dominos. After Feb. 24, 2019, the offer becomes inactive, and off-boarded by RTM 229. However, there is no process in current technology to identify that the store with VSID (73423512) is inactive in the offer program after Feb. 24, 2019, the abstraction layer 233 or the VMID/VSID engine 237 may not start to update the transaction records in the data warehouse 230 for the store with VSID (73423512). For example, there may be some new transaction records being received by the data warehouse 230, at the ingestion layer 231, as shown in the table below.

TABLE 3

| SOURCE_REC_ID | SOURCE_NM | Merchant Name | Street | Address | City | ST | Zip | Tax ID |
| --- | --- | --- | --- | --- | --- | --- | --- | --- |
| 23366424003 | GMR | Dominos | null | | Seattle | WA | 98144 | |
| 23562424004 | GMR | Dominos | null | 65662 | Seattle | WA | 98144 | |
| 492389621 | AMMF | Dominos | 2928 | 1st Ave | Seattle | WA | 98144 | |
| 3209713684 | DnB | Dominos | 2928 | 1st Ave | Seattle | WA | 98144 | 12345 |

Figure 2B:
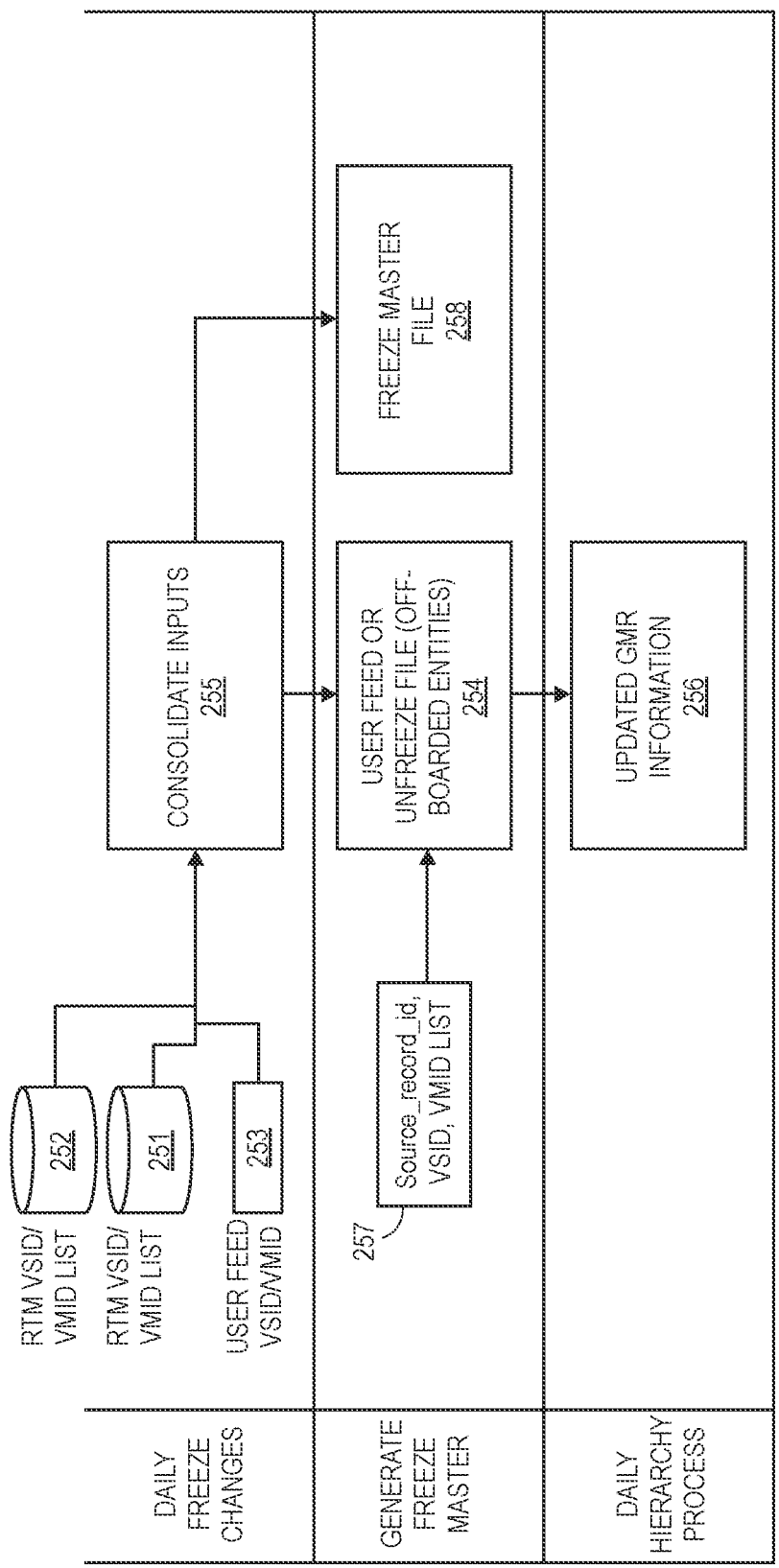

As shown in above Table 3, a new DnB record entered the data warehouse 230 at the ingestion layer 231, but not processed by the abstraction layer 233 or the VMID/VSID engine 237 since the store with VSID (73423512) is frozen, even when the offer on this store has expired. The new record would add significant value to the system as it has accurate address and TAX identifier (ID). FIG. 2(b) illustrates an example process for managing the data warehouse 230 to perform the update operations when the store with VSID (73423512) is inactive in the offer program, even though the offer may still be active at the merchant level for other stores.

As shown in FIG. 2(b), embodiments herein may track the RTM entities or stores that are active in an offer program, by a VSID/VMID list 251. The VSID/VMID list 251 may be a dynamic lookup table containing stores subscribed by the RTM 229. The abstraction layer 233 or the VMID/VSID engine 237 may build a first VSID/VMID list 251 of stores that are active in the offer program at a first time moment, and build a second VSID/VMID list 252 of stores that are active in a second time moment. The set of stores that are in the first VSID/VMID list 251 at the first time moment, but not in the second VSID/VMID list 252 at the second time moment are those stores inactive in the offer program.

In addition, in cases where users would like system to consume changes for few business critical entities even when an active offer exists, the user may provide a 'user feed' VSID/VMID list 253. The users place files with list of entities (VSIDs and VMIDs) they want to unfreeze for just one or more execution even though the stores with the VSIDs have an active offer program, so that downstream systems, e.g., the RTM, would consume the changes on the transaction records for the entities and improve data quality. The VSID/VMID list 251, the VSID/VMID list 252, and the 'user feed' VSID/VMID list 253 together form a consolidated input list 255 to indicate what entities or stores of a merchant can be updated for new transaction records, which is indicated by a list 254, and another list 258 to indicate the list of entities or stores that need to continue to be frozen due to live offers in the RTM. Transaction records for stores in the list 258 are stopped from going downstream, e.g., to pass to the RTM to avoid interference with active offers.

For stores contained in the list 254 to be updated, transaction records 257 may be processed by the abstraction layer 233 or the VMID/VSID engine 237 to produce the updated GMR information 256. For example, for Table 3, the new transaction record from DnB will be processed and updated by the abstraction layer 233 or by the VMID/VSID engine 237. Afterwards, the transaction records for the stores in the list 254 may be sent downstream to other applications or services, e.g., the RTM, to access updates with any additional transaction records they might have missed while they have an active offer program and the transaction records have been 'frozen'. Accordingly, embodiments herein provide specific improvements to the way the data warehouse 230 for an electronic payment transaction processing network is operated, and provide functions previously do not exist for the data warehouse 230. As a result, the list 258 ensures the RTM to maintain offer fidelity by not allowing RTM subscribed entities or stores to change their transaction records, while also making sure that this impact is minimal and the system still continues to grow organically to have other stores not active in an offer program to have updated transaction records to produce the updated GMR information 256.

There may be other kind of hierarchical relationship instead of the one having a merchant containing multiple stores. For example, there may be another hierarchical relationship including a merchant, one or more countries or regions, and one or more stores in each country or region. Such a hierarchical relationship would have three layers of nodes, where the merchant is the parent node, the countries or regions are the child nodes, and the stores are the grandchildren nodes. The update operation may be performed at the country level, instead of at the store level as shown above. For example, the abstraction layer 233 or the VMID/VSID engine 237 may validate a country code and restrict the 'freeze' VMID level requests at country level so that other countries where the merchant is not running offers can be processed normally and enable GMR to process off-boarded merchant entities. Thus, the VSIDs may be segregated within a VMID based on whether it belongs to a country with active offer or not. Thus, stores in a country belonging to same merchant but not having an offer can be removed from the lookup and are free to get organically updated in the future (before this feature, RTM had active offers in two countries only, however, VSIDs from 188 countries are frozen).

FIG. 3 illustrates an example device suitable for use to practice various aspects of the present disclosure, in accordance with various embodiments. While FIG. 3 illustrates various components of a computer system, it is not intended to represent any particular architecture or manner of interconnecting the components. One embodiment may use other systems that have fewer or more components than those shown in FIG. 3.

In FIG. 3, the data processing system 370 includes an inter-connect 371, e.g., bus and system core logic, which interconnects a microprocessor(s) 373, memory 367, and input/output (I/O) device(s) 375 via I/O controller(s) 377. The microprocessor 373 is coupled to cache memory 379. I/O devices 375 may include a display device and/or peripheral devices, such as mice, keyboards, modems, network interfaces, printers, scanners, video cameras and other devices known in the art. In one embodiment, when the data processing system is a server system, some of the I/O devices 375, such as printers, scanners, mice, and/or keyboards, are optional.

In one embodiment, the inter-connect 371 includes one or more buses connected to one another through various bridges, controllers and/or adapters. In one embodiment the I/O controllers 377 include a USB (Universal Serial Bus) adapter for controlling USB peripherals, and/or an IEEE-1394 bus adapter for controlling IEEE-1394 peripherals.

In one embodiment, the memory 367 includes one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. That is, the techniques may be carried out in a computer system or other data processing system in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

In embodiments, a storage medium may store instructions for practicing methods described with references to FIGS. 1-3, in accordance with various embodiments. For example, a non-transitory computer-readable storage medium may include a number of programming instructions. Programming instructions may be configured to enable a device, e.g., the device 370, in response to execution of the programming instructions, to perform, e.g., various operations associated with managing a data warehouse of an electronic payment transaction processing network, e.g., the data warehouse 130, the process 170, the data warehouse 230, and the process shown in FIG. 2(b).

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

We claim:

1. A computer-implemented method for managing a data warehouse of an electronic payment transaction processing network, comprising:
   storing in a storage device of the data warehouse, by one or more processors, an offer record for a merchant that has multiple stores, and at least some of the stores have multiple transactional terminals that process transaction records, the offer record stored to identify a hierarchical relationship of merchant entities including:
   i) a merchant identifier to identify the merchant, the merchant identifier comprising a parent node,
   ii) a store identifier to identify the multiple stores associated with the merchant, the store identifier comprising child nodes,
   iii) a merchandise identifier at the store of the merchant to identify merchandise, and
   iv) an offer rule that defines an offer program as a discount for certain merchandise in some of the stores of the merchant, wherein a first set of the stores is active in the offer program related to the certain merchandise, and a second set of the stores is inactive in the offer program;
   receiving, by the one or more processors, a plurality of new transaction records for the merchant from the electronic payment transaction processing network, where the new transaction records are mapped to a respective merchant identifier and a respective store identifier;

determining, by the one or more processors, when to allow changes in the hierarchical relationships without issuing a merchant-level freeze of transaction processing even though the offer program is only active within specific regions for the merchant by:
  tracking the stores that are active in the offer program by creating a lookup table comprising a first list of the first set of stores active in the offer program in a first time moment, and a second list of the second set of stores inactive in the offer program in a second time moment;
  determining that the first set of stores in the first list at the first time moment, but not in the second list at the second time moment are those stores inactive in the offer program; and
  performing an update operation on the new transaction records for the stores determined to be inactive in the offer program, such that information associated with the hierarchical relationships of the merchant entities is also updated.

2. The method of claim 1 further comprising:
creating a third list to indicate that the stores determined to be inactive in the offer program can be updated with new transaction records; and
creating a fourth list indicating the stores that are not to be updated for being active in the offer program.

3. The method of claim 2, further comprising:
publishing the new transaction records for the stores in the third list for usage by other applications.

4. The method of claim 1, further comprising:
receiving an input including a third set of stores from an input source;
obtaining, by the one or more processors, a set of transaction records through the electronic payment transaction processing network from the third set of stores; and
performing, by the one or more processors, the update operation for the third set of transaction records.

5. The method of claim 4, receiving, by the one or more processors, a user feed list of the merchant entities on which the user indicates to perform the update operation even though an active offer exists, wherein the third set of stores includes a store that is active in the offer program.

6. The method of claim 1, wherein a plurality of new transaction records includes a terminal identification, or a card acceptor identification.

7. The method of claim 1, wherein the first set of stores are located in a first region, and the second set of stores are located in a second region different from the first region.

8. The method of claim 7, wherein the first region is within a first city or country, and the second region is within a second city or country.

9. The method of claim 1, wherein a plurality of new transaction records includes a transaction record for a debit card transaction, a prepaid credit transaction, a credit transaction, a fund transfer transaction, a mobile payment transaction, an online transaction, or a commercial payment transaction.

10. The method of claim 1, wherein the second set of operations includes add transaction records to the data warehouse, and remove transaction records from the data warehouse.

11. The method of claim 1, wherein the first set of operations include read or write operation on the data warehouse, and does not include an update operation on the data warehouse.

12. The method of claim 1, wherein the second set of stores that are inactive in the offer program includes one or more stores that are active in the offer program at a first time instance, but not active in the offer program at a second time instance.

13. An executable software product stored on a non-transitory computer-readable medium containing program instructions for managing a data warehouse for an electronic payment transaction processing network, the program instructions for:
  storing in a storage device of the data warehouse, by one or more processors, an offer record for a merchant that has multiple stores, and at least some of the stores have multiple transactional terminals that process transaction records, the offer record stored to identify a hierarchical relationship of merchant entities including:
    i) a merchant identifier to identify the merchant, the merchant identifier comprising a parent node,
    ii) a store identifier to identify the multiple stores associated with the merchant, the store identifier comprising child nodes,
    iii) a merchandise identifier at the store of the merchant to identify merchandise, and
    iv) an offer rule that defines an offer program as a discount for certain merchandise in some of the stores of the merchant, wherein a first set of the stores is active in the offer program related to the certain merchandise, and a second set of the stores is inactive in the offer program;
  receiving, by the one or more processors, a plurality of new transaction records for the merchant from the electronic payment transaction processing network, where the new transaction records are mapped to a respective merchant identifier and a respective store identifier;
  determining, by the one or more processors, when to allow changes in the hierarchical relationships without issuing a merchant-level freeze of transaction processing even though the offer program is only active within specific regions for the merchant by:
    tracking the stores that are active in the offer program by creating a lookup table comprising a first list of the first set of stores active in the offer program in a first time moment, and a second list of the second set of stores inactive in the offer program in a second time moment;
    determining that the first set of stores in the first list at the first time moment, but not in the second list at the second time moment are those stores inactive in the offer program; and
    performing an update operation on the new transaction records for the stores determined to be inactive in the offer program, such that information associated with the hierarchical relationships of the merchant entities is also updated.

14. The executable software product of claim 13, wherein the data warehouse includes a first group of transaction records for a store in the second set of stores before performing the update operation, and has a second group of transaction records for the store after performing the update operation, wherein the second group of transaction records is different from the first group of transaction records.

15. The executable software product of claim 14, wherein the program instructions are further for:
publishing the new transaction records for the stores determined to be inactive in the offer program for usage by other applications.

16. The executable software product of claim 13, wherein the program instructions are further for:

receiving an input including a third set of stores from an input source;

obtaining a third set of transaction records for a third set of transactions from the third set of stores through the electronic payment transaction processing network; and performing the second set of operations on the data warehouse for the third set of transaction records, wherein the second set of operations includes the update operation on the data warehouse for the third set of transaction records.

17. A system for managing a data warehouse for an electronic payment transaction processing network, comprising:
   a first storage device;
   a transaction handler executed by a first processor, the transaction handler configured to obtain, process and store a plurality of transaction records in the storage device of the electronic payment transaction processing network;
   a data warehouse manager executed by a second processor, the data warehouse manager configured to:
      store in a second storage device of the data warehouse an offer record for a merchant that has multiple stores, and at least some of the stores have multiple transactional terminals that process transaction records, the offer record stored to identify a hierarchical relationship of merchant entities including:
         i) a merchant identifier to identify the merchant, the merchant identifier comprising a parent node,
         ii) a store identifier to identify the multiple stores associated with the merchant, the store identifier comprising child nodes,
         iii) a merchandise identifier at the store of the merchant to identify merchandise, and
         iv) an offer rule that defines an offer program as a discount for certain merchandise in some of the stores of the merchant, wherein a first set of the stores is active in the offer program related to the certain merchandise, and a second set of the stores is inactive in the offer program;
      receive, by the second processor, a plurality of new transaction records for the merchant from the electronic payment transaction processing network, where the new transaction records are mapped to a respective merchant identifier and a respective store identifier;
      determine, by the second processor, when to allow changes in the hierarchical relationships without issuing a merchant-level freeze of transaction processing even though the offer program is only active within specific regions for the merchant by:
         tracking the stores that are active in the offer program by creating a lookup table comprising a first list of the first set of stores active in the offer program in a first time moment, and a second list of the second set of stores inactive in the offer program in a second time moment;
         determining that the first set of stores in the first list at the first time moment, but not in the second list at the second time moment are those stores inactive in the offer program; and
         performing an update operation on the new transaction records for the stores determined to be inactive in the offer program, such that information associated with the hierarchical relationships of the merchant entities is also updated.

* * * * *